United States Patent [19]

Moraschetti

[11] 4,076,377
[45] Feb. 28, 1978

[54] FIBER-OPTIC DEVICE WITH CURVED SLEEVE AND FILLER MATRIX

[75] Inventor: Nando Moraschetti, Bergdietikon, Switzerland

[73] Assignee: Volpi AG, Urdorf, Switzerland

[21] Appl. No.: 655,572

[22] Filed: Feb. 5, 1976

[30] Foreign Application Priority Data

Feb. 19, 1975 Switzerland .......................... 2091/75

[51] Int. Cl.² ............................................. G02B 5/16
[52] U.S. Cl. ................................................ 350/96.25
[58] Field of Search ............... 350/96 B, 96 BC, 96 C

[56] References Cited

U.S. PATENT DOCUMENTS

| 3,331,956 | 7/1967 | Hough et al. | 350/96 B X |
| 3,397,457 | 8/1968 | Gosselin | 350/96 B X |
| 3,496,931 | 2/1970 | Pilling | 350/96 B X |
| 3,614,415 | 10/1971 | Edelman | 350/96 B X |
| 3,912,362 | 10/1975 | Hudson | 350/96 B |
| 3,920,313 | 11/1975 | Wong et al. | 350/96 B X |
| 3,923,372 | 12/1975 | Roland | 350/96 B |

*Primary Examiner*—David H. Rubin
*Attorney, Agent, or Firm*—Toren, McGeady and Stanger

[57] ABSTRACT

A generally flexible fiber-optic light guide comprising a multifilament bundle of coated fibers in a sheath and having at least one permanently bent portion defining a rigid curve, the bent portion being arranged within an end piece or socket of the light guide; the coated fibers within the bent portion being closely packed and embedded in a solid material capable of serving as a lubricant when in an uncured state. The permanently bent portion is produced by arranging the coated fiber closely packed in a straight tube made of a ductile material, filling the tube with an agent capable of serving as a lubricating agent when in an uncured state, bending said tube with the fibers and the lubricating agent and curing the lubricating agent so as to form a solid matrix or bedding for the fibers in the bent portion.

9 Claims, 2 Drawing Figures

FIBER-OPTIC DEVICE WITH CURVED SLEEVE AND FILLER MATRIX

BACKGROUND OF THE INVENTION

The present invention relates to the art of light transmission in wave guides and specifically to a flexible fiber-optic light guide, briefly called a fiber optics of the type including a plurality, e. g. 10 to $10^6$ thin fibers or filaments each consisting of a highly transparent core, e. g. made of glass, fused silica or plastic, and each being provided with a uniform coating of a material having a lower refractive index than the core. Typical coating substances are transparent materials from the broad category of inorganic glasses and organic polymers. For brevity, the combination of such a fiber core with a cladding or coat is referred to as a "conductor" while the assembly including a plurality of fibers is referred to as a "bundle".

The use of such fiber-optic conductors and bundles as well as their production is described in the patent literature since 1926 starting with British Pat. No. 285,738 to J. L. Baird and U.S. Pat. No. 1,751,584 to C. W. Hansell. A resume of the art is to be found in a publication in "Applied Optics and Optical Engineering", edited by R. Kingslake, Academic Press New York 1967, Volume IV, pages 1–29, by W. P. Siegmund "Fiber Optics" incorporated by reference into this specification.

Generally, the core portion of such fibers will have a diameter in the range of from about 10 micrometers to about 100 micrometers while the coating thickness is in the range of, for example, 1 or 2 micrometers. As the refractive index of the coating is smaller than that of the core, any light entering the interface between core and coating will be reflected back into the core rather than entering into an adjacent conductor.

Bundling of the conductors is most critical in the end portions of a flexible fiber-optic device in view of optical continuity, i. e. arrangement within an optic system in which the fiber-optic device is the transmitter of an optical continuity from one of its ends to the other. As an example of such an optical continuity or system, a light source may be near one end of a fiber-optic device used for illuminating an area near its other end, or an image formed by a conventional optical lense system may be transmitted from one end of the device to its other end for scanning, viewing, and the like. The bundle of the device may be branched so as to have one uniform end portion at its receiving or emitting end and two or more end portions at the opposite receiving or emitting end. Such fiber-optic devices may further have separate bundle portions for different functions, e. g. one portion guiding light from a light source near a first end of the device to its opposite second end for reflection, or absence of reflection, upon an object near said second end, guiding the reflected light into said second end, then through another bundle portion to said first end and evaluation of the light signal thus produced by means of a sensor near said first end. In all such systems, the ends of the fiber-optic device are adapted for optical continuity in the sense of being capable to receive and/or emit the light or image. This includes but does not require direct contact. A conventional adaption of the ends of the device for optical continuity is effected, for example, by cutting, grinding, or polishing an end portion so as to produce a substantially planar face thereon, preferably normal to the fiber axes. When such an end portion includes a substantially rigid sleeve, casing or the like, it can be said to constitute a socket and this term includes any type of end piece or head piece of the fiber-optic device to be arranged in optical continuity with another element of the system in question, e. g. a light-source, a light-sensor, a light-receiving area, a light-emitting area, an image-forming area, an area of image processing (scanning), etc. Direct contact of the bundle end in the socket with such other elements is not required though some type of sockets may be used for contact coupling, e. g. between the end faces of adjacent in-line connected bundles.

As is well known, fiber-optic bundles can be used for image-transfer systems if the fibers are properly aligned at both ends, whereas no alignment of the fibers is required when only light — not an organized image — is to be transmitted. As will be explained below, proper alignment of the fibers in a bundle may impose limitations as to the diameter of the fibers.

One of the essential characteristics for various and sometimes contradictory purposes is flexibility of the bundle at least in a portion of its length. In general, flexibility of the conductor as well as of the bundle increases as the diameter of the individual coated fibers or conductors decreases, and a suitable sheath or hose of a flexible material will be used to surround the bundle for protection. For many potential applications of fiber optics, e. g. replacement of a conventional image transmission via lenses, mirrors and prisms by a bundle of flexible light conductors for endoscopy, as well as for light transmission between moving parts of a machine and a stationary apparatus, and for many other purposes where a more or less curved path of transmission (light or image) is advantageous, usefulness of the fiber-optic device will depend, in part, upon its flexibilty.

Flexibility can conveniently be expressed in terms of the smallest possible bending radius of the bundle or the device, respectively. Such minimum bending radius of a fiber optics in the form of a conductor bundle is generally determined by three essential parameters: (a) the mechanical and physical properties of core and cladding material, (b) the diameter of the conductor, and (c) the distance between the conductors.

As a general rule, flexibility of the conductors and the bundle increases and the bending radius obtainable therewith decreases, as the bending strength of the conductors (combined properties of core and cladding) increases and as the diameter of the conductors decreases. Also, a fiber-optic bundle can be bent without breakage of the conductors only if the conductors are in a mutually sliding relation, e. g. by providing that the distance between these conductors is sufficient so that substantial portions of the conductors are free to permit relative motion. On the other hand, such distances between the conductors must be sufficiently small so that the mutual guidance of the conductors prevents that individual conductors are bent more than the bundle and thus are subject to breakage.

For many uses including illumination, signal or image transmission, etc., permanently bent portions would be desirable near one or more of the bundle ends and it may be most advantageous to arrange such permanent bend or curve of the bundle within a head-piece type socket. Such curves may have a homogeneous curvature (i. e. the curve radius remains substantially constant throughout the bend) and may include angles of from about 180° to about 30° or less.

Practical experiments made in connection with this invention indicate that such rigid bends with small radii of curvature are subject to unavoidable and relatively fast aging even when the device is produced with the greatest possible care. Even in the absence of shock-impact one, or mechanical stress in, the permanent bend, some conductors will break spontaneously after a certain period of time. As a consequence, the cross-section of the fiber bundle effective for transmission of light or images will decrease as the age of the fiber-optic device increases.

These problems of the permanent bend or curve present an even more severe limitation in the production of curved or bent portions of fiber optics where the conductors include a core made of fused silica, i. e. the so-called "quartz fibers". The bending strength of quartz or fused silica is less than half the bending strength of normal glass. In addition, some practical reasons of commercial production tend to limit the use of very thin conductors as would be desirable for achieving small radii of curvature in the rigid bend: Mutual coordination or alignment of conductors required for transmitting an image becomes more complicated and time consuming as the numbers of conductors to be assembled and aligned in a bundle having a predetermined cross-sectional area increases. For this reason among others, conductors with a relatively large diameter are preferred for producing image-transmitting bundles. Further, the number of reflections of transmitted light at the interface between core and coating of a fiber increases as the core diameter decreases, and at a bent or curved interface there is a tendency that impinging light will not be totally reflected but will emerge from the fiber. As higher losses of the transmitted light may ensue as the number of reflections per unit of length increases, thinner conductor cores may become impractical thus limiting the bending radius. Finally, fibers with a core made of fused silica frequently will be coated with plastics and the separate coating step required will increase the costs per length of such fibers. As a consequence, fiber-optic devices having cores of fused silica will be less costly if the required effective cross-section of the bundle is filled with conductors having larger diameters.

SUMMARY OF THE INVENTION

A general object of the invention is an improved fiber-optic device of the type indicated above and having a permanently bent portion or curve.

Another general object is an improved method of producing a fiber-optic device of the type indicated and having at least one socket or head-piece portion where the fiber bundle is permanently bent.

Another specific object is the provision of a fiber-optic device including a fiber bundle having a permanently bent portion in which a desired radius of curvature can be obtained with fibers having a comparatively large diameter, i. e. with less fibers per unit of effective cross-sectional area.

Still a further object is a fiber-optic device including a fiber bundle where the fiber core is made of fused silica and where the bundle includes at least one permanently bent portion near an end of said bundle.

Yet another object is an improved curved end piece or socket of a fiber-optic device having an increased operational life.

Another object is a novel method of producing curved end pieces or sockets of fiber-optic devices.

Other objects and advantages will be apparent to the expert in the field of fiber optics in connection with this specification.

It has been found according to the invention that the above objects can be achieved in a permanent bend of a fiber bundle if the portion of said bundle in the area of the intended bend is closely packed in a hollow bending member or sleeve and embedded in a substance capable of acting as a lubricant when in an uncured state so that subsequent bending of the tubular member together with the enclosed fiber bundle plus lubricant will form the desired curved portion which in turn is made permanent by curing of the lubricant.

PREFERRED EMBODIMENTS OF THE INVENTION

In general, a smooth and homogeneous curvature of the fiber bundle in the permanent bend will be preferred and the bundle is curved in a generally circular path of from about 30° to about 180° within an unflexible portion or socket. For the reasons explained above, the term "socket" is intended to include all sorts of configurations of a bundle end including end pieces, heads, couplings, ant the like.

While the fiber diameter is not critical, uniform diameters in the upper parts of the conventional calipers are preferred, e. g. diameters (core plus cladding) in the range of from about 80 micrometers to about 120 micrometers or more. Cores made of quartz (fused silica) having a polymer cladding constitute a preferred group of filaments but the invention is applicable to all types of flexible fiber-optic filaments including those having a core of mineral glass and a cladding of another mineral glass. The critical requirement is that the cladding or coat material has a lower refractive index than the core material but the methods of proper selection are conventional in the art.

Neither the length of the bundle nor the number of fibers per bundle, nor the selection of the flexible sheath surrounding the bundle in its flexible portion, or portions, is critical and any conventional length and sheath material is suitable. The bundle may include as few as about 10 fibres up to thousand and more.

The term "close packing" of the fibers in the hollow bending member generally requires that the closest distance between any pair of adjacent fibers will be smaller than the fiber diameter and preferably less than about one tenth of the fiber diameter.

As a hollow bending member, a tubular member having a substantially homogeneous circular cross-section is preferred but a small taper of the tube may be advantageous for introducing the bundle. While flexible tubular members may be used, ductile tubular members are preferred. The term "ductile" is used in its normal sense to characterize normally solid metals, such as copper, lead, that are neither brittle nor overly flexible. For the purpose of this invention, a material is considered ductile if a tube made of such material with an outer diameter between about 2 mm to about 20 mm and a wall thickness of from about 0.1 mm to about 1 mm can be bent without breaking around a circular mandrel that has a diameter of about 20 mm by about 180° and maintain its bent configuration without external support.

Also, it is preferred for many purposes that the ductile tubular bending member constitutes a permanent lining of the socket or end portion that, according to the invention, includes a permanent bend of the bundle.

After arranging the closely packed bundle in the unbent tubular bending member, a lubricant capable of forming a solid matrix after bending will be introduced so as to fill the interspace of at least a major portion, i.e. at least 30% and preferably at least about 50%, of the length of the tubular member. In general, such interspace is the space portion within the tubular member, or longitudinal portion thereof, that is not occupied by the fibers of the bundle.

Curable lubricants suitable for the invention can be selected from the broad class of fluids capable of controlled solidification, preferably by cross-linking of molecular chains. This includes numerous substances capable of setting or of vulcanizing due to well known methods of producing duroplastic polymers for which the epoxy resins are typical. In their fluid precursor state, e.g. as viscous liquid compositions with the conventional additives, such as catalysts, co-catalysts, accelerators, cross-linking promoters, vulcanizing agents, such substances have been found to affort a remarkable lubricating effect when present in the interspace of the bundle within the tubular bending member.

While not wishing to be bound by any theory the advantages which can be achieved according to this invention can be explained as follows:

The uncured lubricant facilitates a mutual gliding motion of adjacent fibers so as to prevent that the individual fibers will be subject to a stronger compression in their longitudinal direction than is required for achieving the desired radius of curvature of the bent fiber bundle in the final socket. Such increased compression would tend to cause a smaller bending radius of the fiber thus increasing the breaking stress of some of the fibers. After setting of the lubricant, all fibers are in a fixed mutual position so that any internal tensions of the fibers caused by producing the permanent bend do not cause movement or fracture of the fibers embedded in the set lubricant.

As a consequence of this lubricating effect fibers with larger diameters can be arranged in a bend having a given radius of curvature. Also, the above described effect of spontaneous fiber fracture in the permanently curved portion of the bundle can be reduced substantially.

The viscosity of the lubricant prior to curing is not critical as long as a substantially homogeneous distribution throughout the interspace can be achieved prior to bending. Selection of a proper viscosity as well as methods of viscosity control or change are a matter of choice well within the experts' capacity so that a more detailed discussion is not required. This is true for the conditions of transforming the lubricant after bending of the tubular member into a solid matrix embedding the fibers. While the specific conditions may vary according to the type of polymer used such conditions are well known per se and the requirement of mutual compatibility, e.g. between the cladding and/or core material, on the one hand, and the lubricant, on the other hand, does not need a detailed discussion.

It is to be noted that combinations of matrix-forming lubricants may be used, e.g. a combination of a first fluid capable of forming a duroplastic material in one portion of the tubular member and a second fluid capable of forming an elastomer material in an adjacent second portion of the tubular member. Examples of suitable materials for forming such elastomer materials include silicoorganic polymers, e.g. the so-called silicone rubbers of the class having a fluid — even though viscous — precursor.

According to a preferred method for producing the fiber-optic device according to the invention the portion of the fiber bundle intended for the bend is inserted as a substantially dense package into a straight tube, preferably made of a ductile metal, and is arranged with said tube in a bending jig or fixture. Thereafter, an amount of lubricant sufficient for filling the interspace within said tube is forced into said interspace whereupon the bending jig is operated to produce the bend. Curing of the lubricant may be effected within the bending jig or removed therefrom.

BRIEF DESCRIPTION OF THE DRAWINGS

While the specification concludes with claims particularly pointing out and distinctly claiming the subject matter which is regarded as forming the present invention, it is believed that the invention will be better understood from the following description of preferred embodiments taken in connection with the accompanying drawings, in which

DETAILED DESCRIPTION OF PREFERRED EMBODIMENTS

It is to be noted that the various components shown in the figures are not shown in their true dimensional ratios but that some parts are enlarged for better illustration. Structural elements and process steps as are obvious to the expert will not be discussed in detail.

Figure 1:
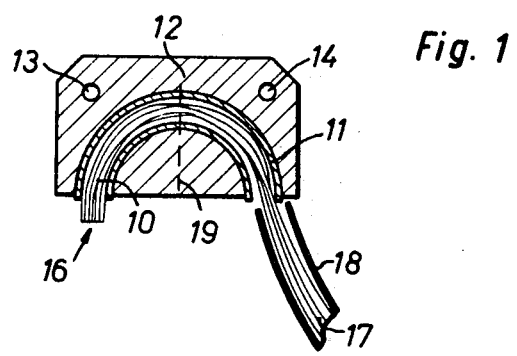
FIG. 1 is a diagrammatic cross-sectional view of an end portion of a fiber-optic device having a rigid bend or curve.

FIG. 1 shows one end portion of an embodiment of the novel fiber-optic device having a rigid or permanent curve. Bundled optical fibers 10 are guided by a metal tube 11 in the area of the bend. Metal tube 11 including the fiber bundle is encased in a plastics housing 12 having bores 13, 14 for securing the housing on a mounting means (not shown). End portion 16 of the fiber-optic device is ground and polished in a conventional manner so as to permit optimum entry or exit of light into the fiber-optics. Fiber bundle 17 emerging from the housing is arranged within a sheath made of a flexible hose or jacket 18. The interspace between fibers 10 in the portion extending from end 16 to about the center of the curve or bend as indicated by a broken line 19 is filled with an epoxy resin while the interspace between fibers 10 in the portion extending from the opposite end of tube 11 to the center of the curve marked by line 19 is filled with a macromolecular silicoorganic compound. As is apparent from FIG. 1, the assembly shown represents a novel type of socket or head-piece comprising the end portion 16 of the bundle of fibers 10 plus tubular member 11 shown after bending and an optional casing 12. Of the remaining parts of the fiber-optic device only a portion of sheath 18 (optionally connected with casing 12 in a manner not shown in the drawing) with fiber bundle 17 is shown. The other end, or ends, of bundle 17 can have a conventional structure, e.g. a socket for plugging into an image-receiving or light-receiving apparatus, or it may include an additional socket with a curved bundle arrangement according to the invention.

Figure 2:
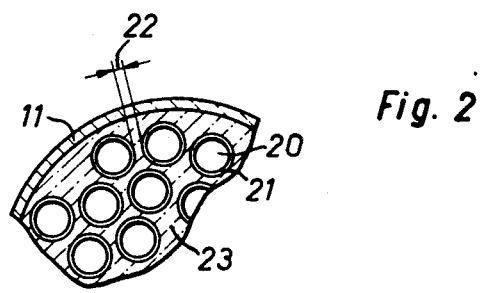
FIG. 2 is a diagrammatic enlarged view of a portion of a cross-section through a rigid bend of the novel fiber-optic device.

FIG. 2 represents a portion of a cross-sectional view of a rigid bend or curve of a fiber-optic device according to the invention. Each fiber core 20 is provided with a conventional cladding or coat 21 having a lower refractive index than the material of the core. Distances 22 between the fibers are generally of the same magnitude as the thickness of coat 21. The interspace between the individual fibers as well as between the fibers and tube 11 is filled with a matrix 23 formed of cured lubricant.

Preferably, at least a portion of the matrix, e. g. the cured polymeric silicoorganic compound provided in a portion of the interspace within tube 11, has a lower refractive index than the material of the cores 20 of fibers 10. When using such a matrix material any light emerging from the ruptured end of a fiber that breaks during operation of the fiber-optic device will be reflected back into the fiber at least in part thus reducing undesired "cross-talk" with an adjacent unruptured fiber.

For producing the socket arrangement of FIG. 1 it is preferred that the portion of the bundled fibers intended for the permanent bend is drawn into a substantially straight tube made of a pliable material, preferably a ductile material. A small opening provided near the middle of the tube length will be connected with a source of vacuum, e.g. a suction pump. In a preferably simultaneous operation, a liquid epoxy resin precursor effective as a lubricant will be sucked-up from one end of the metal tube, while a curable liquid silicoorganic compound will be sucked-up from the other end of the tube into the interspace under the effect of the suction pump until the entire interspace between the individual fibers and the inner surface of the tube is filled. Immediately thereafter and prior to substantial setting of the epoxy resin precursor the tube is inserted into a bending jig and slowly bent to produce the intended curve. Both the uncured epoxy resin precursor and the polymer silicoorganic compound will act as lubricants for the fibers in the bending operation. The curved portion may then be removed from the bending jig and treated for complete curing of the epoxy resin, e.g. by storing at ambient temperature for a period of time. Thereafter, the fiber-optic device will be finished in a conventional manner, e.g. by arranging the flexible sheath or jacket 18 around fiber bundle 17, and processing the other bundle end in a manner known per se, e.g. by cementing and polishing. As indicated above, the entire interspace within tube 11 can be filled with the liquid epoxy resin precursor.

If the fiber bundle and the setting lubricant are kept in the bending fixture for a period of time sufficient for complete curing or setting of the resin, a tube made of a plastic material can be used instead of a metal tube 11.

As a specific example, a general-purpose fiber-optic device is produced according to the above process using a bundle of about fifty fibers 10 each having a substantially circular cross-section and a diameter of about 100 micrometers. The fibers are of a commercially available type consisting of a core made of quartz coated with a thin layer of polytetrafluoroethylene of the type known as TEFLON (Trade Mark of E. I. Du Pont de Nemours and Company). The fibers in the area of the permanent bend are encompassed by a copper tube having an inner diameter of about 0.8 mm. The bending radius is about 20 mm. The epoxy resin precursor is a commercial product sold under the trade name EPIKOTE by Rheinische Olefin-Werke GmbH of Germany while the macromolecular silicoorganic compound is a commercial product sold under the trademark "Silopren" by Bayer, Germany.

The fibers in the curved part of the bundle within the socket thus produced are arranged in a dense package permitting high quality transmission of light signals or images. The fiber-optic device is stable for prolonged periods of time in that spontaneous fiber-fracture in the permanently bent portion of the bundle is prevented, or rendered negligible, as evidenced by substantially constant transmission properties.

The above embodiment includes core fibers of fused silica so that light in the ultraviolet range can be transmitted with the fiber-optic device. However, similar advantages can be obtained with core materials for transmission of electromagnetic radiation with a different range of wave-length.

Thus, while some preferred embodiments of the invention have been discussed above, it is to be understood that the invention is not limited thereto but may be otherwise variously embodied and practiced within the scope of the following claims.

Accordingly, what is claimed is:

1. A fiber-optic device comprising a length of a fiber bundle having a flexible portion housed in a flexible sheath, and portions of said fiber bundle adapted for optical continuity, at least one substantially rigid portion of said fiber bundle being enclosed in a substantially constantly curved sleeve member, said fiber bundle consisting of a plurality of fibers each having a core of a transparent material provided with a substantially uniform coating of a material having a lower refractive index than said material of said core and each of said fibers having a substantially uniform diameter, said rigid portion defining a permanently bent part of said bundle in which the distance between adjacent fibers is smaller than said diameter, and said rigid portion comprising a solid matrix formed of two different substances, said curved sleeve member having a first end and a second end, said matrix comprising from said first end of said sleeve to a midpoint between said ends thereof an epoxy resin and from said second end of said sleeve to the midpoint between said ends thereof a cured silicoorganic compound, and said matrix filling the space within said curved sleeve member not occupied by said fibers.

2. The fiber-optic device of claim 1, wherein said substantially rigid portion of said fiber bundle is an end portion of said fiber bundle and wherein said curved sleeve member is a socket member having a curvature in the range of up to about 180°.

3. The fiber-optic device of claim 1, wherein said distance between adjacent fibers is less than about one tenth of said diameter of said fibers.

4. The fiber-optic device of claim 1, wherein said curved sleeve member is a curved tube around at least one of said end portions and said sleeve member having a curvature in the range of up to 180°.

5. The fiber-optic device of claim 1, wherein said sleeve member consists of a tube made of a ductile metal.

6. The fiber-optic device of claim 1, wherein said fiber cores are made of fused silica.

7. The fiber-optic device of claim 1, wherein said silicoorganic material has a lower refractive index than said material of said fiber.

8. A fiber-optic cable comprising a bundle of flexible light-conductors, a sheath enclosing a length of said bundle and a socket means at one end of said bundle, said socket means including a tubular lining of a ductile metal defining a permanently bent end portion of said bundle; said conductors being closely packed and embedded in said bent portion by a matrix formed of a set lubricant, said bent portion having a first end and a second end, said matrix comprising from said first end of said bent portion to a midpoint between the ends thereof an epoxy resin and from said second end of said bent portion to the midpoint between the ends thereof a cured silicoorganic compound.

9. In a fiber-optic cable comprising a fiber bundle and at least one socket-type end portion, the improvement of said end portion comprising a curved tubular member rigidly enclosing a portion of said fiber bundle in a closely packed arrangement and embedded in a solid matrix formed of a set lubricant, said curved tubular member having a first end and a second end, said matrix comprising from said first end of said tubular member to a midpoint between the ends thereof an epoxy resin and from said second end of said tubular member to the midpoint between the ends thereof a cured silicoorganic compound.

* * * * *